US012689960B2

(12) United States Patent
Wu et al.

(10) Patent No.: US 12,689,960 B2
(45) Date of Patent: Jul. 21, 2026

(54) METHOD AND APPARATUS FOR CONDITIONAL HANDOVER IN NETWORK

(71) Applicant: Lenovo (Beijing) Limited, Beijing (CN)

(72) Inventors: Lianhai Wu, Beijing (CN); Min Xu, Beijing (CN); Jing Han, Beijing (CN); Hongmei Liu, Beijing (CN); Bingchao Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 369 days.

(21) Appl. No.: 18/285,111

(22) PCT Filed: Apr. 1, 2021

(86) PCT No.: PCT/CN2021/085069
§ 371 (c)(1),
(2) Date: Sep. 29, 2023

(87) PCT Pub. No.: WO2022/205361
PCT Pub. Date: Oct. 6, 2022

(65) Prior Publication Data
US 2024/0179604 A1     May 30, 2024

(51) Int. Cl.
*H04W 36/24* (2009.01)
*H04W 36/36* (2009.01)

(52) U.S. Cl.
CPC ....... *H04W 36/249* (2023.05); *H04W 36/362* (2023.05)

(58) Field of Classification Search
CPC .......................... H04W 36/362; H04W 36/249
See application file for complete search history.

(56) References Cited

U.S. PATENT DOCUMENTS

| | | | |
|---|---|---|---|
| 2019/0223073 A1* | 7/2019 | Chen | H04W 36/0077 |
| 2020/0260346 A1* | 8/2020 | Moon | H04W 76/18 |
| 2021/0051550 A1* | 2/2021 | Latheef | H04W 36/08 |

FOREIGN PATENT DOCUMENTS

| | | |
|---|---|---|
| CN | 110536365 A | 12/2019 |
| CN | 110637478 A | 12/2019 |
| CN | 112584552 A | 3/2021 |
| KR | 20200127405 A | 11/2020 |

OTHER PUBLICATIONS

Lenovo et al.: "SON Enhancements for CHO", 3GPP; R3-206454, 3rd Generation Partnership Project (3GPP), (R3-206454), 3GPP TSG-RAN WG3 Meeting #110e, Online, Nov. 2-12, 2020 (Year: 2020).*

(Continued)

*Primary Examiner* — Myron Wyche
(74) *Attorney, Agent, or Firm* — FIG. 1 Patents

(57) ABSTRACT

Disclosed are methods and apparatus for conditional handover (CHO) in network. One embodiment of the subject application provides a method performed by a user equipment includes receiving, from a serving cell, a CHO configuration and at least an associated CHO execution conditions for a candidate cell, wherein the associated CHO execution condition includes at least a time-based condition; evaluating the associated CHO execution condition; and determining whether to execute a CHO based on the evaluation.

20 Claims, 11 Drawing Sheets

100

110 — receiving, from a serving cell, a CHO configuration and at least an associated CHO execution condition, wherein the associated CHO execution condition includes a time-based condition 120 — evaluating the associated CHO execution condition 130 — determining whether to execute a CHO based on the evaluation

(56) References Cited

OTHER PUBLICATIONS

Lenovo , et al., "SON Enhancements for CHO", 3GPP TSG-RAN WG3 Meeting #110e, R3-206454, Online [retrieved Nov. 28, 2023]. Retrieved from the Internet <https://www.3gpp.org/ftp/tsg_ran/WG3_lu/TSGR3_110-e/Docs>, Nov. 2020, 5 pages.

PCT/CN2021/085069 , "International Preliminary Report on Patentability", PCT Application No. PCT/CN2021/085069, Oct. 12, 2023, 5 pages.

PCT/CN2021/085069 , "International Search Report and Written Opinion", PCT Application No. PCT/CN2021/085069, Jan. 5, 2022, 6 pages.

* cited by examiner

<u>100</u>

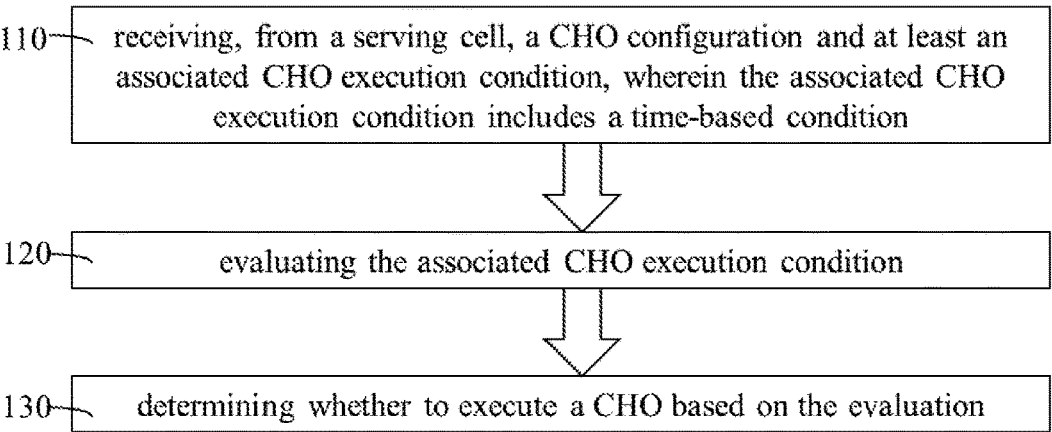

110 — receiving, from a serving cell, a CHO configuration and at least an associated CHO execution condition, wherein the associated CHO execution condition includes a time-based condition 120 — evaluating the associated CHO execution condition 130 — determining whether to execute a CHO based on the evaluation

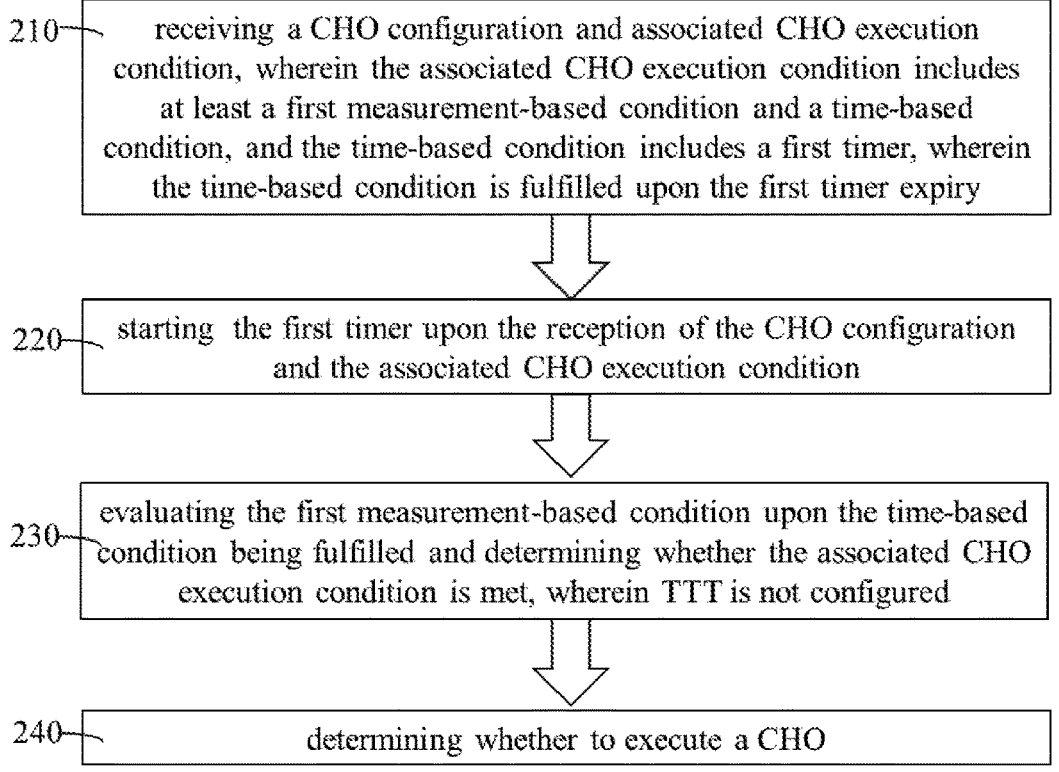

210 — receiving a CHO configuration and associated CHO execution condition, wherein the associated CHO execution condition includes at least a first measurement-based condition and a time-based condition, and the time-based condition includes a first timer, wherein the time-based condition is fulfilled upon the first timer expiry 220 — starting the first timer upon the reception of the CHO configuration and the associated CHO execution condition 230 — evaluating the first measurement-based condition upon the time-based condition being fulfilled and determining whether the associated CHO execution condition is met, wherein TTT is not configured 240 — determining whether to execute a CHO

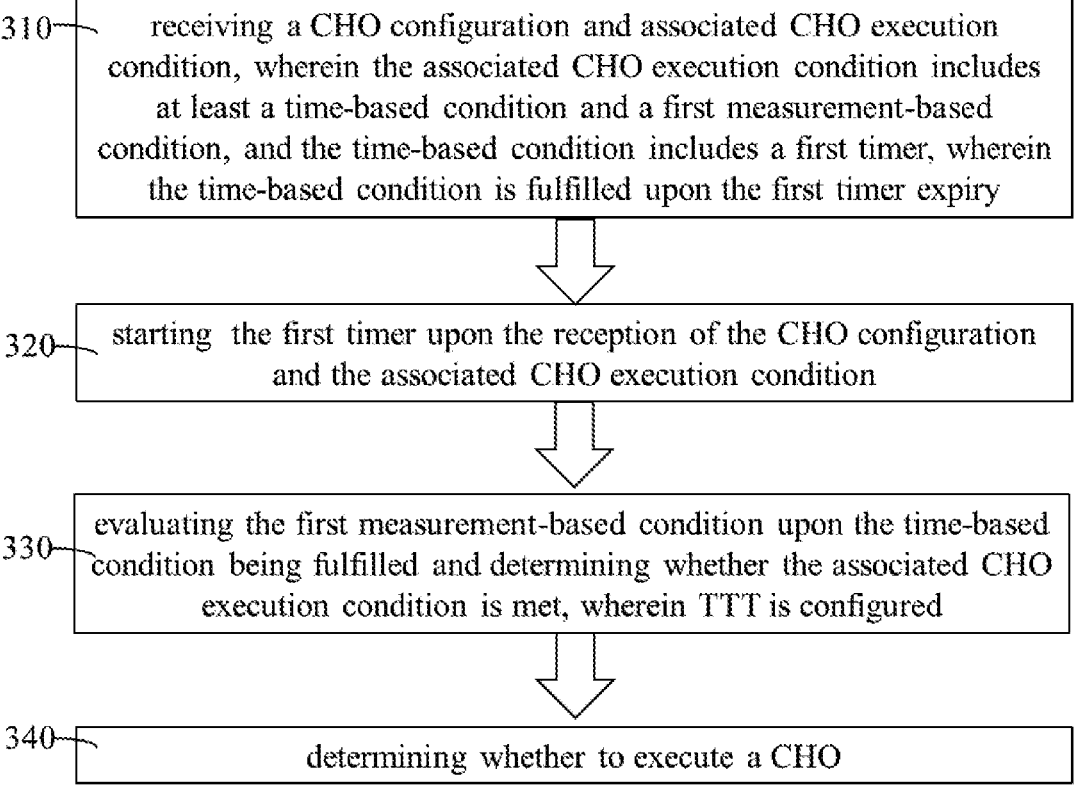

310 — receiving a CHO configuration and associated CHO execution condition, wherein the associated CHO execution condition includes at least a time-based condition and a first measurement-based condition, and the time-based condition includes a first timer, wherein the time-based condition is fulfilled upon the first timer expiry 320 — starting the first timer upon the reception of the CHO configuration and the associated CHO execution condition 330 — evaluating the first measurement-based condition upon the time-based condition being fulfilled and determining whether the associated CHO execution condition is met, wherein TTT is configured 340 — determining whether to execute a CHO

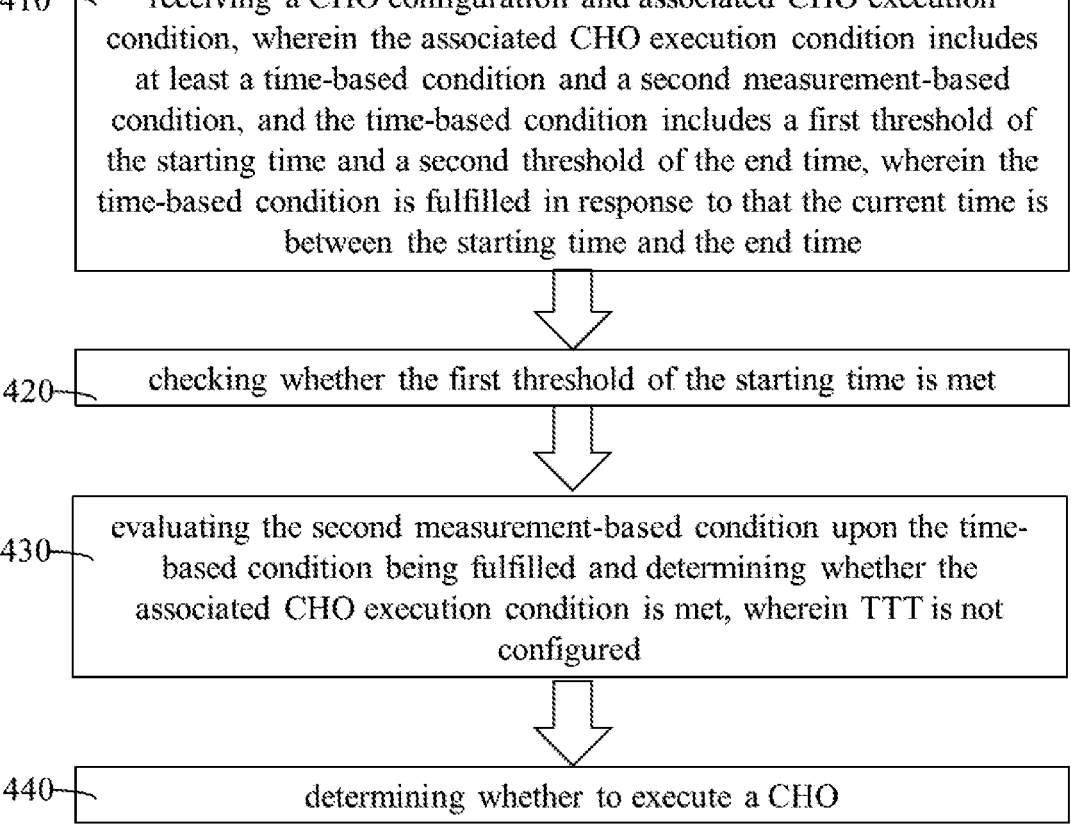

410 — receiving a CHO configuration and associated CHO execution condition, wherein the associated CHO execution condition includes at least a time-based condition and a second measurement-based condition, and the time-based condition includes a first threshold of the starting time and a second threshold of the end time, wherein the time-based condition is fulfilled in response to that the current time is between the starting time and the end time 420 — checking whether the first threshold of the starting time is met 430 — evaluating the second measurement-based condition upon the time-based condition being fulfilled and determining whether the associated CHO execution condition is met, wherein TTT is not configured 440 — determining whether to execute a CHO

Figure 4

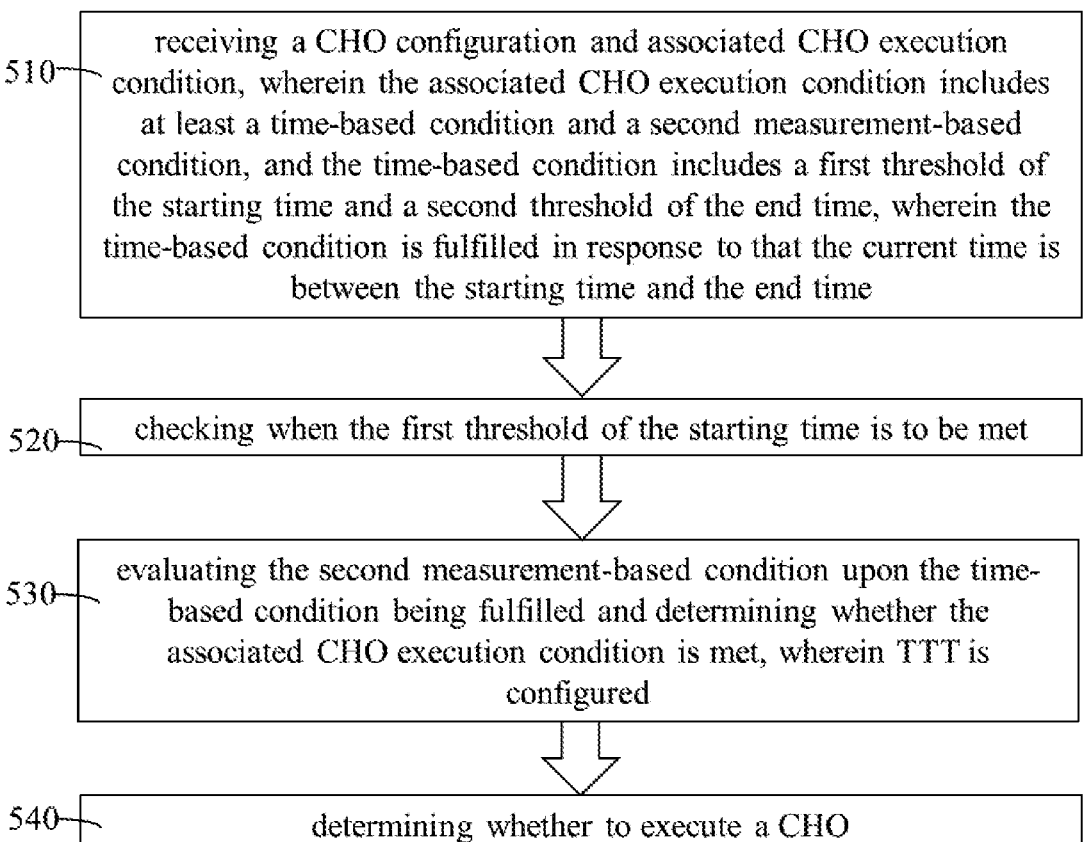

500

510 — receiving a CHO configuration and associated CHO execution condition, wherein the associated CHO execution condition includes at least a time-based condition and a second measurement-based condition, and the time-based condition includes a first threshold of the starting time and a second threshold of the end time, wherein the time-based condition is fulfilled in response to that the current time is between the starting time and the end time 520 — checking when the first threshold of the starting time is to be met 530 — evaluating the second measurement-based condition upon the time-based condition being fulfilled and determining whether the associated CHO execution condition is met, wherein TTT is configured 540 — determining whether to execute a CHO

Figure 5

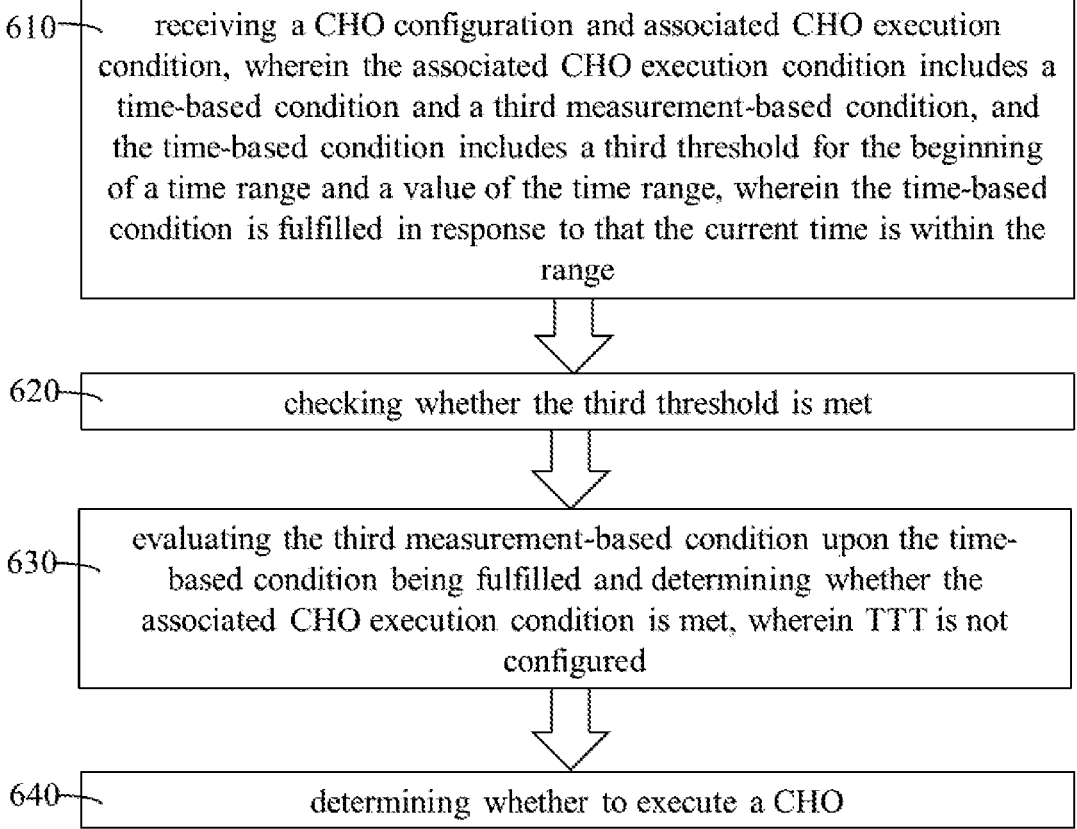

600

610 — receiving a CHO configuration and associated CHO execution condition, wherein the associated CHO execution condition includes a time-based condition and a third measurement-based condition, and the time-based condition includes a third threshold for the beginning of a time range and a value of the time range, wherein the time-based condition is fulfilled in response to that the current time is within the range 620 — checking whether the third threshold is met 630 — evaluating the third measurement-based condition upon the time-based condition being fulfilled and determining whether the associated CHO execution condition is met, wherein TTT is not configured 640 — determining whether to execute a CHO

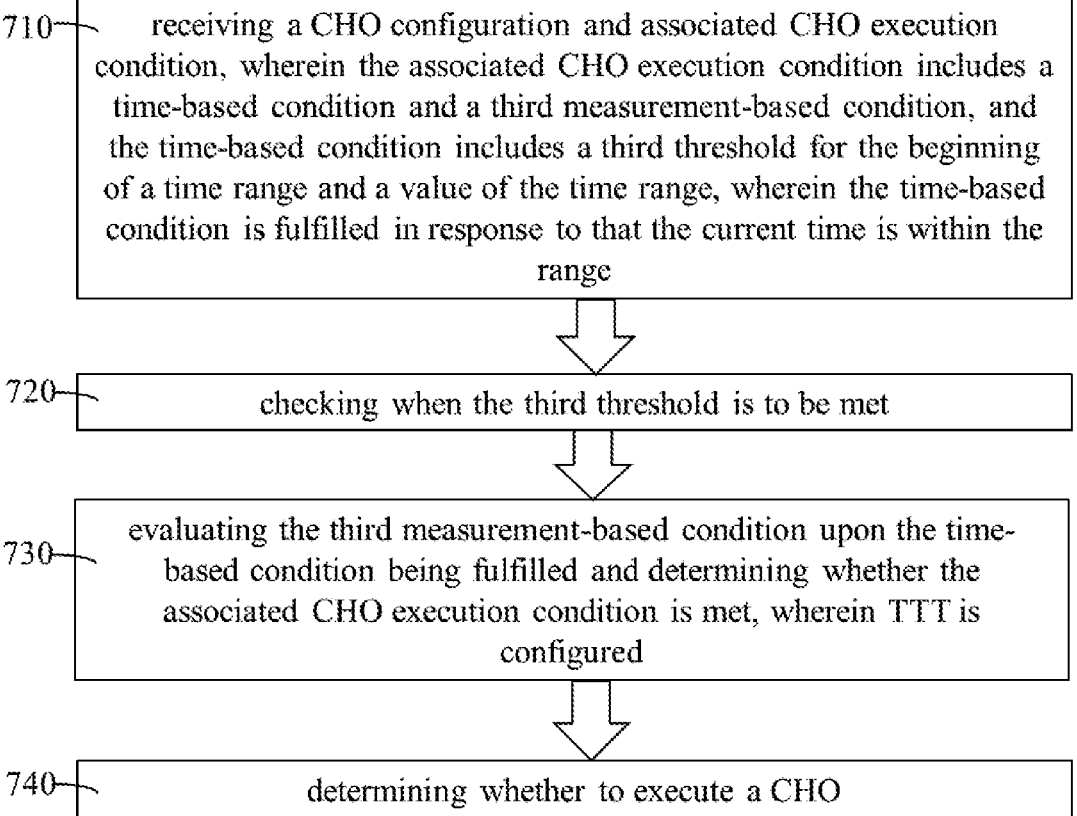

710 — receiving a CHO configuration and associated CHO execution condition, wherein the associated CHO execution condition includes a time-based condition and a third measurement-based condition, and the time-based condition includes a third threshold for the beginning of a time range and a value of the time range, wherein the time-based condition is fulfilled in response to that the current time is within the range 720 — checking when the third threshold is to be met 730 — evaluating the third measurement-based condition upon the time-based condition being fulfilled and determining whether the associated CHO execution condition is met, wherein TTT is configured 740 — determining whether to execute a CHO

Figure 7

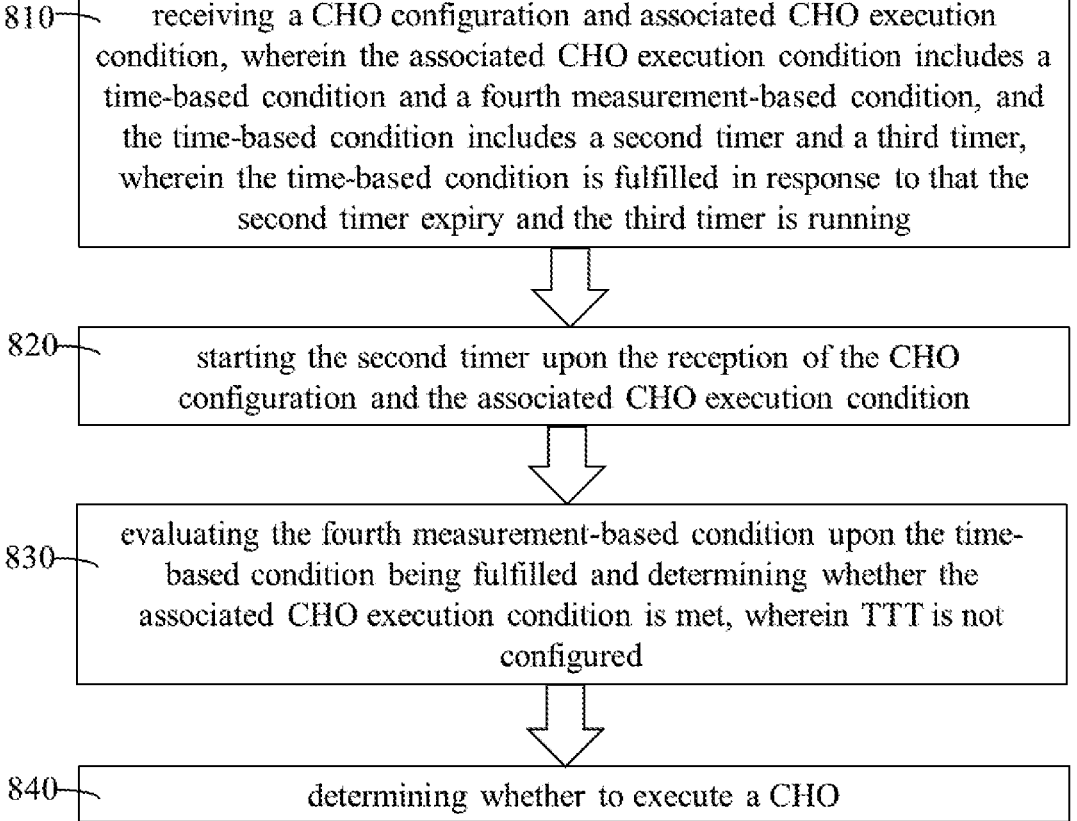

<u>800</u>

810 — receiving a CHO configuration and associated CHO execution condition, wherein the associated CHO execution condition includes a time-based condition and a fourth measurement-based condition, and the time-based condition includes a second timer and a third timer, wherein the time-based condition is fulfilled in response to that the second timer expiry and the third timer is running 820 — starting the second timer upon the reception of the CHO configuration and the associated CHO execution condition 830 — evaluating the fourth measurement-based condition upon the time-based condition being fulfilled and determining whether the associated CHO execution condition is met, wherein TTT is not configured 840 — determining whether to execute a CHO

Figure 8

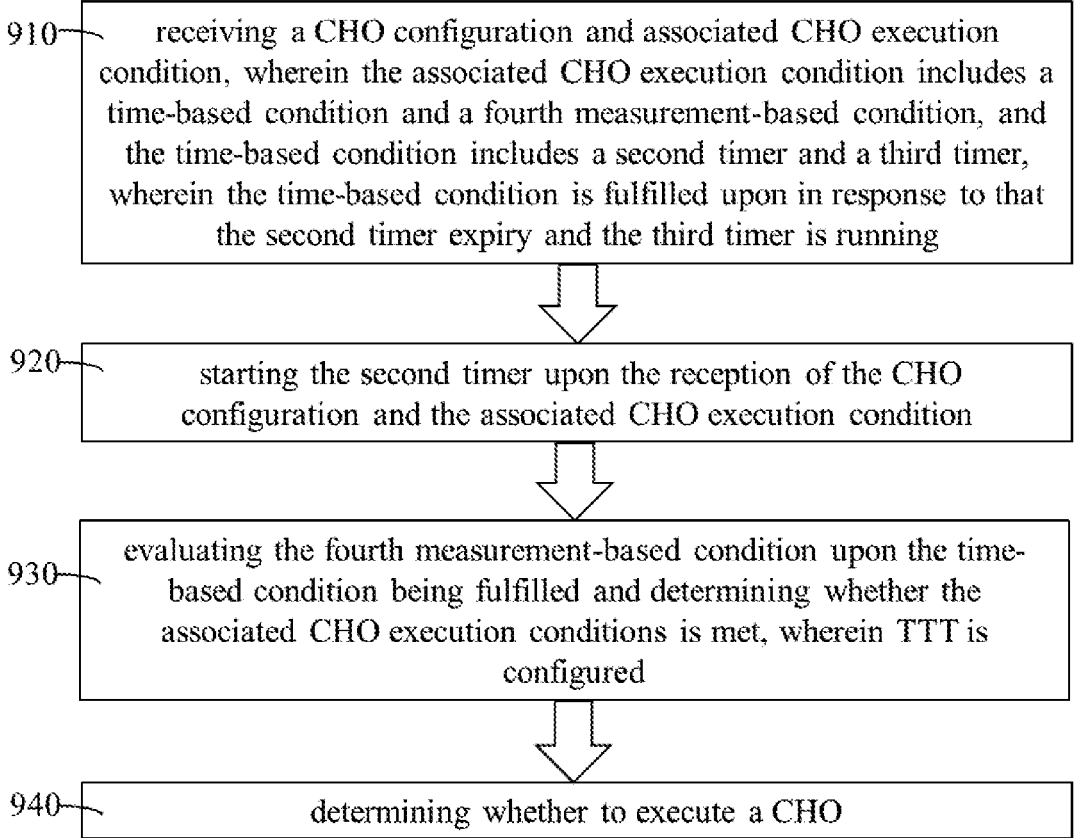

900

910 — receiving a CHO configuration and associated CHO execution condition, wherein the associated CHO execution condition includes a time-based condition and a fourth measurement-based condition, and the time-based condition includes a second timer and a third timer, wherein the time-based condition is fulfilled upon in response to that the second timer expiry and the third timer is running 920 — starting the second timer upon the reception of the CHO configuration and the associated CHO execution condition 930 — evaluating the fourth measurement-based condition upon the time-based condition being fulfilled and determining whether the associated CHO execution conditions is met, wherein TTT is configured 940 — determining whether to execute a CHO

1310 ⟶ declaring an RLF or receiving a handover command

1320 ⟶ accessing a target cell

1330 ⟶ transmitting assistant information about at least whether the associated CHO execution condition is met <u>1400</u>

METHOD AND APPARATUS FOR CONDITIONAL HANDOVER IN NETWORK

TECHNICAL FIELD

The present disclosure relates to methods and apparatus for conditional handover (CHO) in network.

BACKGROUND OF THE INVENTION

New mobile services that require low-latency and high reliability performance are emerging. While the 5G standard has been designed to address these services from the start, the evolution of 5G New Radio (NR) needs to continuously enhance the mobility robustness performance for these challenging scenarios. The main mobility enhancement specified by 3GPP in Rel-16, named CHO, focuses on reducing the number of failure occurrences while a user is moving (for example, when a handover between cells fails, or when a connection fails even before a handover (HO) is triggered).

CHO plays an important role in reducing delay and interruption, and ensuring business continuity during the movement of a user equipment (UE). In CHO, instead of preparing one target cell as in the legacy case, multiple candidate target cells are prepared in advance in the network, which enables the CHO command to be sent to a UE earlier than at normal handover when the radio conditions are still good, rather than when conditions start to get degraded as in legacy handover. Together with the command, the UE also receives an associated CHO execution condition to be monitored. When the CHO execution condition is fulfilled, the UE applies the previously stored CHO command, as if the network would have just sent it, instead of first sending a measurement report (that could fail to be transmitted) and then waiting to receive the command (which may fail to be received).

When received, the UE stores the CHO command and the associated CHO execution condition, instead of applying it immediately. In fact, the UE only applies the stored CHO command when the associated CHO execution condition stored in the UE is satisfied for a corresponding configured candidate target cell, and then the UE executes the CHO and connects to the target cell as in a normal handover.

The associated CHO execution condition that defines the criteria to apply the stored CHO command is based on the quality of the serving cell(s) and neighbor cells, somewhat similar to the condition that in previous releases leads the UE to transmit a measurement report when some condition is fulfilled. For example, the network can configure the UE to transmit a measurement report when a neighbor cell becomes an offset better than the serving cell, as a way to indicate to the network that a handover may be needed. In CHO, a similar condition can be configured as the associated CHO execution condition, except that instead of transmitting the measurement report, the mobile terminal applies the stored message. Sending the CHO command when the radio conditions are still favorable reduces the risk of failing the transmission of the measurement report and/or the reception of the handover command.

On the network side, the serving node can prepare one or more target "candidate" cells, as it's not certain if the UE will access a specific target cell. The CHO preparation procedure(s) has some similarities with the handover preparation procedure, and the outcome is the creation of a CHO command (i.e. an RRCReconfigurationmessage containing the target's configuration), except that the target node does not expect the UE to access it immediately, and in some cases, not even to access it at all.

SUMMARY

In some embodiments, a method performed by a UE, the method includes: receiving, from a serving cell, a CHO configuration and associated CHO execution condition for a candidate cell, wherein the associated CHO execution condition includes at least a time-based condition; evaluating the associated CHO execution condition; and determining whether to execute a CHO.

In some embodiment, the associated CHO execution condition includes a first timer and a first measurement-based condition, wherein the time-based condition is fulfilled upon the first timer expiry.

In some embodiments, the method further includes starting the first timer upon the reception of the CHO configuration and the associated CHO execution condition.

In some embodiments, the method further includes determining that the first measurement-based condition is fulfilled upon the time-based condition is fulfilled, and initiating a CHO in response to the first measurement-based condition being fulfilled.

In some embodiments, the method further includes: determining that the measurement-based condition is not fulfilled upon the time-based condition is fulfilled; and in response to the measurement-based condition is not fulfilled upon the time-based condition is fulfilled, stopping evaluating the first measurement-based condition and/or releasing the CHO execution condition.

In some embodiments, wherein the CHO execution condition further comprises: a first threshold of the staring time; a second threshold of the end time; and a second measurement-based condition, wherein the time-based condition is fulfilled in response to a current time is between the starting time and the end time.

In some embodiments, wherein the method further comprises: In some embodiments, the method further includes: determining whether the first threshold of the starting time is met; starting to evaluate the second measurement-based condition in response to that the first threshold of the starting time is met, or starting to evaluate the second measurement-based condition at an offset value ahead of the first threshold of the staring time.

In some embodiments, the method further includes determining, upon the time-based condition is fulfilled, that the second measurement-based condition is fulfilled, and initiating a CHO.

In some embodiments, the method further includes: determining, upon the time-based condition is fulfilled, that the second measurement-based condition is not fulfilled before the second threshold of the end time is met, and stopping evaluating the second measurement-based condition and/or releasing the CHO execution condition.

In some embodiments, wherein the associated CHO execution condition includes a third threshold for the beginning of a time range, a value of the time range, a third measurement-based condition, wherein the time-based condition is fulfilled in response to a current time is within the time range.

In some embodiments, the method further includes starting to evaluate the third measurement-based condition in response to the third threshold for the beginning of time range is met; or starting to evaluate the third measurement-based condition at an offset value ahead of the beginning of time range.

In some embodiments, the method further includes upon the time-based condition is fulfilled, determining whether the third measurement-based condition is fulfilled within the time range; and in response to the third measurement-based condition being fulfilled within the time range, initiating CHO.

In some embodiments, the method further includes, in response to the third measurement-based condition not being fulfilled within the time range, stopping evaluating the third measurement-based condition and/or releasing the CHO execution condition.

In some embodiments, wherein the associated CHO execution condition includes: a second timer, a third timer, a fourth measurement-based condition, wherein the time-based condition is fulfilled in response to the second timer expiry and the third timer is running.

In some embodiments, the method further includes starting the second timer in response to receiving the CHO configuration and the associated CHO execution condition.

In some embodiments, the method further includes: in response to the second timer expiry, starting the third timer; and in response to the second timer expiry or in response to starting the third timer, starting to evaluate the fourth measurement-based condition in response to the second timer expiry, or starting to evaluate the fourth measurement-based condition at an offset value ahead of the second timer expiry.

In some embodiments, the method further includes: upon the time-based condition is fulfilled, determining whether the fourth measurement-based condition is fulfilled before the third timer expires; and initiating a CHO in response to the fourth measurement-based condition being fulfilled before the third timer expires.

In some embodiments, the method further includes, in response to the fourth measurement-based condition not being fulfilled before the third timer expires, stopping evaluating the fourth measurement-based condition and/or releasing the CHO execution condition.

In some embodiments, the method further includes: declaring a radio link failure (RLF) or receiving an handover command; accessing a target cell; transmitting at least one of: an indication to indicate whether the first timer expires when the RLF happens; an indication to indicate whether the first timer expires when receiving the handover command; and an indication to indicate whether the first measurement-based condition is met; and an indication to indicate whether the first measurement-based condition is met before the first timer runs in response to the first measurement-based condition being met, an indication to indicate whether the first measurement-based condition is met while the first timer runs in response to the first measurement-based condition being met, an indication to indicate whether the first measurement-based condition is met after the first timer expiry in response to the first measurement-based condition being met; and/or an indication to indicate the time information associated with that the first measurement-based condition is met.

In some embodiments, the method further includes: declaring an RLF or receiving a handover command; accessing a target cell; transmitting at least one of: an indication to indicate whether the RLF occurs before, within, or after a time range determined by the starting time and the end time; an indication to indicate whether the reception of the handover command occurs before, within, or after the time range; and an indication to indicate whether the second measurement-based condition is met; and an indication to indicate whether the second measurement-based condition is met before the time range in response to the third measurement-based condition being met; and an indication to indicate time information associated with that the second measurement-based condition is met.

In some embodiments, the method further includes: declaring an RLF or receiving a handover command; accessing a target cell; transmitting at least one of: an indication to indicate whether the RLF occurs before, within, or after the time range; an indication to indicate whether the reception of the handover command occurs before, within, or after the time range; an indication to indicate whether the third measurement-based condition is met; and an indication to indicate whether the third measurement-based condition is met before the time range in response to the third measurement-based condition being met; and an indication to indicate the time information associated with that the third measurement-based condition is met.

In some embodiments, the method further includes: declaring an RLF or receiving a handover command; accessing a target cell; transmitting at least one of: state of the second timer and the third timer when the RLF or the reception of the handover command occurs; and an indication to indicate whether the fourth measurement-based condition is met; and state of the second time and the third time when the fourth measurement-based condition is met in response to the fourth measurement-based condition being met; and an indication to indicate the time information associated with that the fourth measurement-based condition is met.

In some embodiments, the measurement-based condition includes at least one of CondEvent A3, CondEvent A4, CondEvent A5, or a combination thereof.

In some embodiments, an apparatus includes a non-transitory computer-readable medium having stored thereon computer-executable instructions, a receiving circuitry, a transmitting circuitry, and a processor coupled to the non-transitory computer-readable medium, the receiving circuitry and the transmitting circuitry, and the computer-executable instructions are executable by the processor to cause the apparatus to implement various methods according embodiments of the present application.

In some embodiments, an apparatus includes a processor; a transceiver coupled to the processor, wherein the processor is configured: to receive, via the transceiver, a conditional handover (CHO) configuration and at least an associated CHO execution condition for a candidate cell from a serving cell, wherein the associated CHO execution condition includes a time-based condition; to evaluate the associated CHO execution condition; and to determine whether to execute a CHO based on the evaluation.

BRIEF DESCRIPTION OF THE DRAWINGS

Some exemplary embodiments will now be described, by way of non-limiting examples, with reference to the accompanying drawings.

FIG. 1 illustrates an exemplary method 100 performed by a UE according to the present disclosure.

FIG. 2 illustrates an exemplary method 200 performed by a UE according to the method 100 of the present disclosure.

FIG. 3 illustrates an exemplary method 300 performed by a UE according to the method 100 of the present disclosure.

FIG. 4 illustrates an exemplary method 400 performed by a UE according to the method 100 of the present disclosure.

FIG. 5 illustrates an exemplary method 500 performed by a UE according to the method 100 of the present disclosure.

FIG. 6 illustrates an exemplary method 600 performed by a UE according to the method 100 of the present disclosure.

FIG. 7 illustrates an exemplary method 700 performed by a UE according to the method 100 of the present disclosure.

FIG. 8 illustrates an exemplary method 800 performed by a UE according to the method 100 of the present disclosure.

FIG. 9 illustrates an exemplary method 900 performed by a UE according to the method 100 of the present disclosure.

DETAILED DESCRIPTION

Figure 10A:
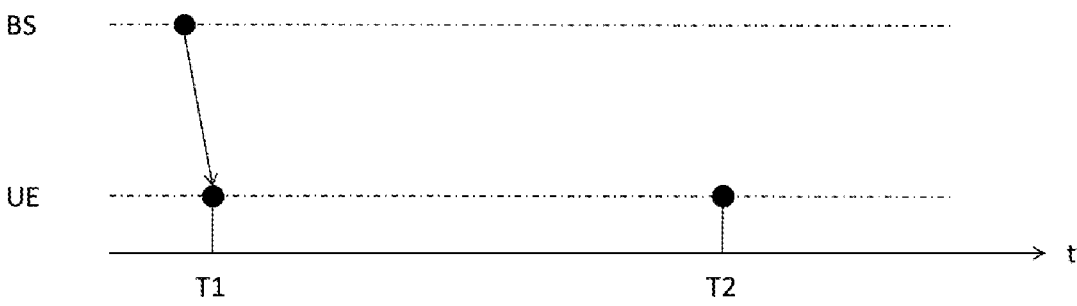
FIG. 10 (including 10A and 10B) illustrate exemplary timing sequences according to exemplary methods of the present disclosure.

The present disclosure relates to methods and apparatus for CHO in a radio access network (RAN).

As has described, CHO plays an important role in reducing delay and interruption, and ensuring business continuity during the movement of a UE. The UE may decide to perform a CHO based on whether certain measurement condition is fulfilled.

In some cases, for examples, if a UE moves in a fixed orbit, a motion path of the UE is predicable, or a motion path of a candidate cell is predicable or fixed (e.g., a non-terrestrial network (NTN) such as a NTN low Earth orbiting (LEO)), the UE may perform a CHO based on a time condition, or on a combination of a time condition and a measurement condition. It would helpful for power saving, signaling overhead, or other functionalities.

Herein below, some example embodiments are described in detail with reference to the accompanying drawings according to the present disclosure. The detailed description of the appended drawings is intended as a description of the preferred embodiments of the present invention, and is not intended to represent the only form in which the present invention may be practiced. It should be understood that the same or equivalent functions may be accomplished by different embodiments that are intended to be encompassed within the spirit and scope of the present invention.

It is contemplated that along with developments of network architectures and new service scenarios, all embodiments in the present application are also applicable to similar technical problems, and moreover, the terminologies recited in the present application may change, which should not affect the principle of the present application.

FIG. 1 illustrates an exemplary method 100 performed by a UE to perform a CHO according to the present disclosure.

As shown in FIG. 1, the method 100 includes at least an operation 110, an operation 120, and an operation 130. The operation 110 illustrates receiving, from a serving cell, a CHO configuration and at least an associated CHO execution condition for a candidate cell, wherein the associated CHO execution condition includes at least a time-based condition. The operation 120 illustrates evaluating the associated CHO execution condition. The operation 130 illustrates determining whether to execute a CHO based on the evaluation.

In some embodiments, in the operation 130, the UE determines whether to execute a CHO at least in response to the time-based condition being fulfilled.

In some embodiments, in the operation 130, the associated CHO execution condition includes at least a timer, a time threshold, and/or a time range.

In some embodiments, the serving cell may send at least one CHO configuration and associated CHO execution condition for at least one candidate cell to the UE.

In some embodiments, the associated CHO execution condition at least includes a time-based condition and a measurement-based condition.

In some embodiments, the measurement-based condition may be a CondEvent A3, a CondEvent A4, a CondEvent A5, or a combination thereof.

In some embodiments, the measurement-based condition may be S-criteria.

In some embodiments, the UE evaluates the measurement-based condition upon the time-based condition being fulfilled.

In some embodiments, the measurement-based condition may by a CondEvent A3, a CondEvent A4, a CondEvent A5, or a combination thereof. In some embodiments, time to trigger (TTT) is not configured in the measurement-based condition. In some embodiments, TTT is configured in the measurement condition.

In some embodiments, the measurement-based condition may be S-criteria.

In some embodiments, the operation 130 further comprises initiating a CHO in response to the associated CHO execution condition being fulfilled (i.e., both the time-based condition and the measurement-based condition being fulfilled).

In some embodiments, the operation 130 further comprises stopping evaluating the measurement-based condition and/or releasing the CHO execution condition in response to determining that the measurement-based condition is not fulfilled while the time-based condition is fulfilled.

FIG. 2 illustrates an exemplary method 200 performed by a UE to perform a CHO according to the method 100 of the present disclosure, wherein TTT is not configured in the measurement-based condition.

As shown in FIG. 2, the method 200 includes at least an operation 210, an operation 220, an operation 230, and an operation 240. The operation 210 illustrates receiving, from a serving cell, a CHO configuration and associated CHO execution condition for a candidate cell, wherein the associated CHO execution condition includes at least a time-based condition, wherein the time-based condition includes a first timer and a first measurement-based condition, wherein the time-based condition is fulfilled upon the first timer expiry. The operation 220 illustrates starting the first timer upon the reception of the CHO configuration and the associated CHO execution condition. The operation 230 illustrates evaluating the first measurement-based condition upon the time-based condition being fulfilled: if the first measurement-based condition is fulfilled, the associated CHO execution condition is determined to be fulfilled; otherwise, the associated CHO execution condition is determined not to be fulfilled. The operation 240 illustrates determining whether to execute a CHO at least according to the state of the associated CHO execution condition: if the associated CHO execution condition is fulfilled, the CHO is determined to be performed; otherwise, the CHO is determined not to be performed.

In some embodiments, the operation 240 further comprises performing a CHO in response to determining the associated CHO execution condition being fulfilled, and stopping evaluating the first measurement-based condition and/or releasing the CHO execution condition in response to determining the first measurement-based condition being not fulfilled upon the time-based condition being fulfilled.

In some embodiment, the first measurement-based condition may be S-criteria.

FIG. 3 illustrates an exemplary method 300 performed by a UE to perform a CHO according to the method 100 of the present disclosure, wherein TTT is configured in the measurement-based condition.

As shown in FIG. 3, the method 300 includes at least an operation 310, an operation 320, an operation 330, and an operation 340. The operation 310 illustrates receiving, from a serving cell, a CHO configuration and associated CHO execution condition for a candidate cell, wherein the associated CHO execution condition includes at least a time-based condition and a first measurement-based condition, and the time-based condition includes a first timer, wherein the time-based condition is fulfilled upon the first timer expiry. The operation 320 illustrates starting the first timer upon the reception of the CHO configuration and the associated CHO execution condition. The operation 330 illustrates evaluating the first measurement-based condition from an offset value (e.g., equals to TTT) ahead of the first timer expiry to the first timer expiry: if the first measurement-based condition is fulfilled in the duration from an offset value ahead of the first timer expiry to the first timer expiry, the associated CHO execution condition is determined to be fulfilled; otherwise, the associated CHO execution condition is determined not to be fulfilled. The operation 340 illustrates determining whether to execute a CHO at least according to whether the associated CHO execution condition is fulfilled: if the associated CHO execution condition is determined to be fulfilled, the CHO is to be performed; and if the associated CHO execution condition is determined to be not fulfilled, the CHO is not to be performed.

In some embodiments, the offset value is configured or predefined.

In some embodiments, the offset value equals to TTT.

In some embodiments, the operation 340 further comprises performing a CHO in response to determining the associated CHO execution condition being fulfilled, and stopping evaluating the first measurement-based condition and/or releasing the CHO execution condition in response to determining the first measurement-based condition being not fulfilled upon the time-based condition being fulfilled.

In some embodiment, the first measurement-based condition may be S-criteria.

FIG. 4 illustrates an exemplary method 400 performed by a UE to perform a CHO according to the method 100 of the present disclosure, wherein TTT is not configured in the measurement-based condition.

As shown in FIG. 4, the method 400 includes at least an operation 410, an operation 420, an operation 430, and an operation 440. The operation 410 illustrates receiving, from a serving cell, a CHO configuration and associated CHO execution condition for a candidate cell, wherein the associated CHO execution condition includes a time-based condition and a second measurement-based condition, wherein the time-based condition includes a first threshold of the starting time, a second threshold of the end time, and wherein the time-based condition is fulfilled in response to that the current time is between the starting time and the end time. The operation 420 illustrates checking whether the first threshold of the starting time is met after the reception of the CHO configuration and the associated CHO execution condition. The operation 430 illustrates starting to, in response to the first threshold of the starting time being met, evaluate the second measurement-based condition, determining that the associated CHO execution condition is fulfilled in response to that the second measurement-based condition is fulfilled before the second threshold of the end time, and determining that the associated CHO execution condition is not fulfilled in response to that the second measurement-based condition is not fulfilled before the second threshold of the end time. The operation 440 illustrates determining to execute a CHO in response to that the associated CHO execution condition is fulfilled; otherwise determining not to execute the CHO.

In some embodiments, the operation 440 further comprises performing a CHO in response to determining the associated CHO execution condition being fulfilled, and stopping evaluating the second measurement-based condition and/or releasing the CHO execution condition in response to determining the second measurement-based condition being not fulfilled upon the time-based condition being fulfilled.

FIG. 5 illustrates an exemplary method 500 performed by a UE to perform a CHO according to the method 100 of the present disclosure, wherein TTT is configured in the measurement-based condition.

As shown in FIG. 5, the method 500 includes at least an operation 510, an operation 520, an operation 530, and an operation 540. The operation 510 illustrates receiving, from a serving cell, a CHO configuration and associated CHO execution condition for a candidate cell, wherein the associated CHO execution condition includes a time-based condition and a second measurement-based condition, wherein the time-based condition includes a first threshold of the starting time, a second threshold of the end time, and wherein the time-based condition is fulfilled in response to that the current time is between the starting time and the end time. The operation 520 illustrates checking when the first threshold of the starting time is met after the reception of the CHO configuration and the associated CHO execution condition. The operation 530 illustrates starting to evaluate the second measurement-based condition from an offset value ahead of the first threshold of the starting time, determining that the associated CHO execution condition is met in response to that the second measurement-based condition is fulfilled in a duration of the offset value before the second threshold of the end time, and determining that the associated CHO execution condition is not met in response to that there is no any duration of the offset value before the second threshold of the end time that the second measurement-based condition is fulfilled. The operation 540 illustrates determining to execute a CHO in response to that the associated CHO execution condition is fulfilled; otherwise determining not to execute the CHO.

In some embodiments, the offset value is configured or predefined.

In some embodiments, the offset value equals to TTT.

In some embodiments, the operation 540 further comprises performing a CHO in response to determining the associated CHO execution condition being fulfilled, and stopping evaluating the second measurement-based condition and/or releasing the CHO execution condition in response to determining the second measurement-based condition being not fulfilled upon the time-based condition being fulfilled.

FIG. 6 illustrates an exemplary method 600 performed by a UE to perform a CHO according to the method 100 of the present disclosure, wherein TTT is not configured in the measurement-based condition.

As shown in FIG. 6, the method 600 includes at least an operation 610, an operation 620, an operation 630, and an operation 640. The operation 610 illustrates receiving, from a serving cell, a CHO configuration and associated CHO execution condition for a candidate cell, wherein the associated CHO execution condition includes at least a time-based condition and a third measurement-based condition, and the time-based condition includes a third threshold for the beginning of a time range and a value of the time range, wherein the time-based condition is fulfilled in response to a current time is within the time range. The operation 620 illustrates checking whether the third threshold for the beginning of the time range is met. The operation 630 illustrates starting to, in response to the third threshold being met, evaluate the third measurement-based condition before the end of the time range, determining that the associated CHO execution condition is fulfilled in response to that the third measurement-based condition is fulfilled before the end of the time range, and determining that the associated CHO execution condition is not fulfilled in response to that the third measurement-based condition is not fulfilled before the end of the time range. The operation 640 illustrates determining to execute a CHO in response to that the associated CHO execution condition is fulfilled; otherwise determining not to execute the CHO.

In some embodiments, the operation 640 further comprises performing a CHO in response to determining the associated CHO execution condition being fulfilled, and stopping evaluating the third measurement-based condition and/or releasing the CHO execution condition in response to determining the third measurement-based condition being not fulfilled upon the time-based condition being fulfilled.

FIG. 7 illustrates an exemplary method 700 performed by a UE to perform a CHO according to the method 100 of the present disclosure, wherein TTT is configured in the measurement-based condition.

As shown in FIG. 7, the method 700 includes at least an operation 710, an operation 720, an operation 730, and an operation 740. The operation 710 illustrates receiving, from a serving cell, a CHO configuration and associated CHO execution condition for a candidate cell, wherein the associated CHO execution condition includes at least a time-based condition and a third measurement-based condition, and the time-based condition includes a third threshold for the beginning of a time range and a value of the time range, wherein the time-based condition is fulfilled in response to a current time is within the time range. The operation 720 illustrates checking when the third threshold for the beginning of the time range is met. The operation 730 illustrates starting, at an offset value ahead of the third threshold for the beginning of the time range, to evaluate the third measurement-based condition, determining that the associated CHO execution condition is fulfilled in response to that the third measurement-based condition is fulfilled before the end of the time range, and determining that the associated CHO execution condition is not fulfilled in response to that the third measurement-based condition is not fulfilled before the end of the time range. The operation 740 illustrates determining to execute a CHO in response to that the associated CHO execution condition is fulfilled; otherwise determining not to execute the CHO.

In some embodiments, the offset value is configured or predefined.

In some embodiments, the offset value equals to TTT.

In some embodiments, the operation 740 further comprises performing a CHO in response to determining the associated CHO execution condition being fulfilled, and stopping evaluating the third measurement-based condition and/or releasing the CHO execution condition in response to determining the third measurement-based condition being not fulfilled upon the time-based condition being fulfilled.

FIG. 8 illustrates an exemplary method 800 performed by a UE to perform a CHO according to the method 100 of the present disclosure, wherein TTT is not configured in the measurement-based condition.

As shown in FIG. 8, the method 800 includes at least an operation 810, an operation 820, an operation 830, and an operation 840. The operation 810 illustrates receiving, from a serving cell, a CHO configuration and associated CHO execution condition for a candidate cell, wherein the associated CHO execution condition at least include a time-based condition and a fourth measurement-based condition, and the time-based condition includes a second timer and a third timer, wherein the time-based condition is fulfilled upon the second timer expiry and the third timer running. The operation 820 illustrates starting the second timer upon the reception of the CHO configuration and the associated CHO execution condition. The operation 830 illustrates: upon the second timer expiry, starting the third timer; and in response to the second timer expiry or in response to the third timer being started, starting to evaluate the fourth measurement-based condition, determining that the associated CHO execution condition is fulfilled in response to that the fourth measurement-based condition is fulfilled upon the time-based condition being fulfilled, and determining that the associated CHO execution condition is not fulfilled in response to that the fourth measurement-based condition is not fulfilled when the time-based condition being fulfilled. The operation 840 illustrates determining to execute a CHO in response to that the associated CHO execution condition is fulfilled; otherwise determining not to execute the CHO.

In some embodiments, the operation 840 further comprises performing a CHO in response to determining the associated CHO execution condition being fulfilled, and stopping evaluating the fourth measurement-based condition and/or releasing the CHO execution condition in response to determining the fourth measurement-based condition being not fulfilled upon the time-based condition being fulfilled.

FIG. 9 illustrates an exemplary method 900 performed by a UE to perform a CHO according to the method 100 of the present disclosure, wherein TTT is configured in the measurement-based condition.

As shown in FIG. 9, the method 900 includes at least an operation 910, an operation 920, an operation 930, and an operation 940. The operation 910 illustrates receiving, from a serving cell, a CHO configuration and associated CHO execution condition for a candidate cell, wherein the associated CHO execution condition at least include a time-based condition and a fourth measurement-based condition, and the time-based condition includes a second timer and a third timer, wherein the time-based condition is fulfilled upon the second timer expiry and the third timer running. The operation 920 illustrates starting the second timer upon the reception of the CHO configuration and the associated CHO execution condition. The operation 930 illustrates starting to evaluate the fourth measurement-based condition at an offset value ahead of the second timer expiry, and starting the third timer upon the second timer expiry, determining that the associated CHO execution condition is fulfilled in response to that the fourth measurement-based condition is fulfilled upon the time-based condition being fulfilled, and determining that the associated CHO execution condition is not fulfilled in response to that the fourth measurement-based condition is not fulfilled when the time-based condition being fulfilled. The operation 940 illustrates determining to execute a CHO in response to that the associated CHO execution condition is fulfilled; otherwise determining not to execute the CHO.

In some embodiments, the offset value is configured or predefined.

In some embodiments, the offset value equals to TTT.

In some embodiments, the operation 940 further comprises performing a CHO in response to determining the associated CHO execution condition being fulfilled, and stopping evaluating the fourth measurement-based condition and/or releasing the CHO execution condition in response to determining the fourth measurement-based condition being not fulfilled upon the time-based condition being fulfilled.

FIGS. 10-12 (including 10A and 10B) illustrate exemplary timing sequences according to exemplary methods of the present disclosure.

As shown in FIG. 10A, referring to method 200, at T1, the UE receives a CHO configuration and associated CHO execution condition and starts the first timer. At T2, the first timer expires (i.e., the time-based condition is fulfilled). In this example, TTT is not configured, and the UE evaluates the first measurement-based condition at T2: if the first measurement-based condition is fulfilled, the associated CHO execution condition is determined to be fulfilled; otherwise, the associated CHO execution condition is determined not to be fulfilled.

In some embodiments, at T2, if the first measurement-based condition is not fulfilled, the UE may stop evaluating the first measurement-based condition and/or release the CHO execution condition.

Figure 10B:
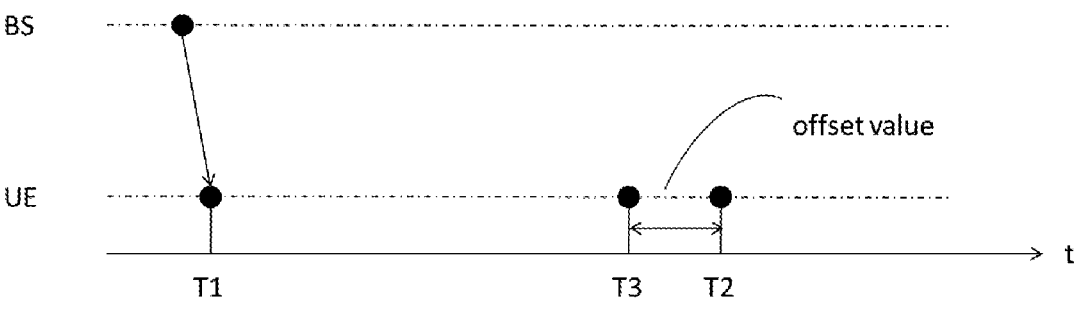

As shown in FIG. 10B, referring to method 300, at T1, the UE receives a CHO configuration and associated CHO execution condition and starts the first timer. At T2, the first timer expires (i.e., the time-based condition is fulfilled). In this example, TTT is configured, and T3 is a time point at an offset value ahead of T2, wherein the offset value is configured or predefined. According to method 300, the UE starts to evaluate the first measurement-based condition at T3 and stops the evaluation upon the first timer expiry (i.e., T2). If the first measurement-based condition is fulfilled during the time duration from T3 to T2, the associated CHO execution condition is determined to be fulfilled; otherwise, the associated CHO execution condition is determined not to be fulfilled.

In some embodiments, at T2, if the first measurement-based condition is not fulfilled, the UE may stop evaluating the first measurement-based condition and/or release the CHO execution condition.

In some embodiments, if the first measurement-based condition is not fulfilled in a duration decided by T3 and T2, the UE may stop evaluating the first measurement-based condition and/or release the CHO execution condition.

Figure 11A:
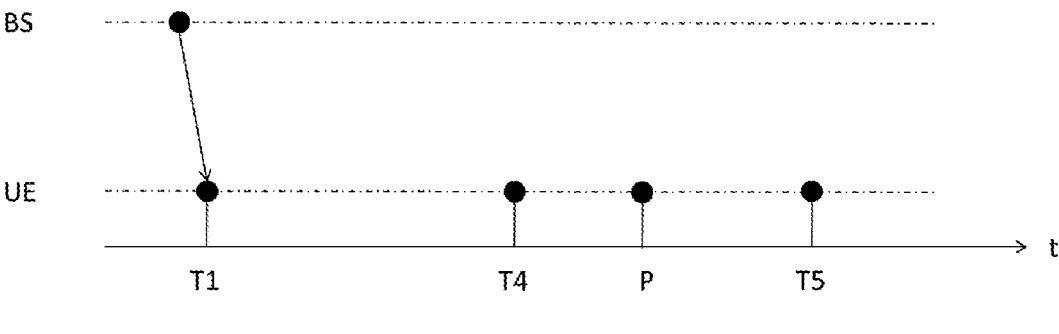
FIG. 11 (including 11A and 11B) illustrate exemplary timing sequences according to exemplary methods of the present disclosure.

As shown in FIG. 11A, referring to method 400, at T1, the UE receives a CHO configuration and associated CHO execution condition and starts the first timer. Upon or after a while since the reception of the CHO configuration and the associated CHO execution condition, the UE checks whether the first threshold of the starting time is met. For example, the first threshold of the starting time is met at T4, and the second threshold of the end time is at T5. In this example, TTT is not configured. The UE starts to evaluate the second measurement-based condition in a duration decided by T4 and T5 where the second threshold of the end time is met. The time-based condition is fulfilled in a duration decided by T4 and T5. The UE determines whether the second measurement-based condition is fulfilled when the time-based condition is fulfilled. If the second measurement-based condition is fulfilled in the duration from T4 to T5, the associated CHO execution condition is determined to be fulfilled; otherwise, the associated CHO execution condition is determined not to be fulfilled.

For example, if the second measurement-based condition is not fulfilled in a duration decided by T4 and T5, the UE may stop evaluating the second measurement-based condition and/or release the CHO execution condition.

For example, as shown in FIG. 11A, if the second measurement-based condition is fulfilled at the time point P between T4 and T5, the UE determines that the associated CHO execution condition is fulfilled, determines to execute a CHO, and/or stops evaluating the second measurement-based condition at the time point P.

Figure 11B:
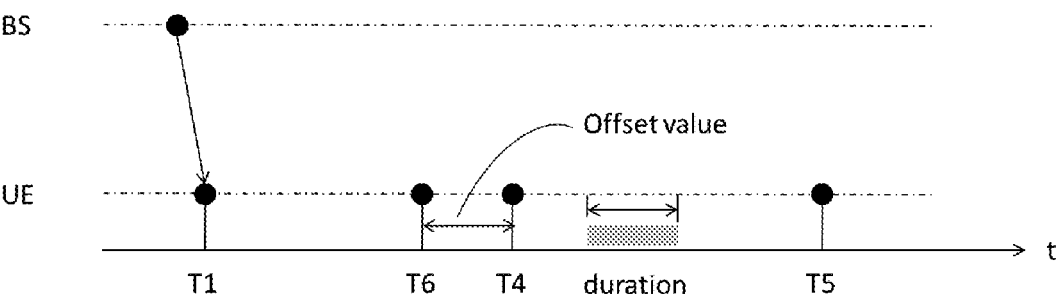

As shown in FIG. 11B, referring to method 500, at T1, the UE receives a CHO configuration and associated CHO execution condition and starts the first timer. Upon or after a while since the reception of the CHO configuration and the associated CHO execution condition, the UE checks whether the first threshold of the starting time is met. For example, the first threshold of the starting time is met at T4, and the second threshold of the end time is at T5. In this example, TTT is configured. T6 is at an offset value ahead of T4. The time-based condition is fulfilled if the current time is between T6 and T4. The UE evaluates the second measurement-based condition in the duration decided by T6 to T5.

If the second measurement-based condition is fulfilled in a duration (equal to the offset value) between T6 and T5, the associated CHO execution condition is determined to be fulfilled; otherwise, if there is not such a duration equal to the offset value between T6 and T5, the associated CHO execution condition is determined to be fulfilled.

For example, as shown in FIG. 11B, in a duration (equals to the offset value) between T6 and T4, if the second measurement-based condition is fulfilled in the duration, the associated CHO execution condition is determined to be fulfilled. If there is not such a duration, the associated CHO execution condition is determined to be not fulfilled.

In some embodiments, if the second measurement-based condition is fulfilled in the duration as shown in FIG. 11B, the UE may perform a CHO at the end of the duration and stop evaluating the second measurement-based condition.

In some embodiments, if the second measurement-based condition is not fulfilled in a duration decided by T6 and T5, the UE may stop evaluating the second measurement-based condition and/or release the CHO execution condition.

Figure 12A:
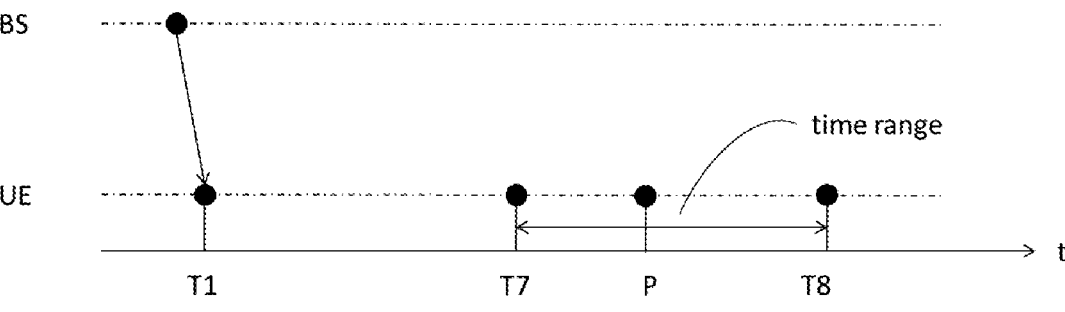
FIG. 12 (including 12A and 12B) illustrate exemplary timing sequences according to exemplary methods of the present disclosure.

As shown in FIG. 12A, referring to method 600, at T1, the UE receives a CHO configuration and associated CHO execution condition and starts the first timer. Upon or after a while since the reception of the CHO configuration and the associated CHO execution condition, the UE checks whether the third threshold for the beginning of a time range is met. For example, the third threshold for the beginning of a time range is met at T7, and T8 is an end of the time range. The time-based condition is fulfilled if the current time is between T7 and T8 (i.e., within the time range). For example, at the time point P, the time-based condition is fulfilled. In this example, TTT is not configured. The UE starts to evaluate the third measurement-based condition at T7. The UE determines whether the third measurement-based condition is fulfilled during the time range from T7 to T8. For example, if the third measurement-based condition is fulfilled at the time point P, the associated CHO execution condition is determined to be fulfilled, the UE may determine to execute a CHO, and/or stop evaluating the third measurement-based condition at the time point P.

If the UE determines that the third measurement-based condition is not fulfilled within the time range from T7 to T8, the associated CHO execution condition is determined not to be fulfilled.

In some embodiments, associated CHO execution condition is determined not to be fulfilled, the UE may stop evaluating the third measurement-based condition and/or release the CHO execution condition.

Figure 12B:
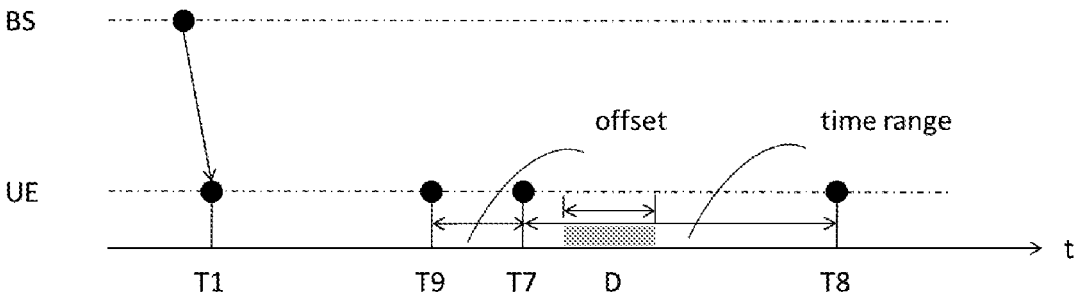

As shown in FIG. 12B, referring to method 700, at T1, the UE receives a CHO configuration and associated CHO execution condition and starts the first timer. Upon or after a while since the reception of the CHO configuration and the associated CHO execution condition, the UE checks when the third threshold for the beginning of a time range is to be met. For example, the third threshold for the beginning of a time range is met at T7, and the time range is end at T8. The time-based measurement condition is fulfilled if the current time is between T7 and T8. In this example, TTT is configured. The UE starts to evaluate the third measurement-based condition from T9 to T8 where the duration is end, wherein T9 is at an offset value ahead of T7.

If the third measurement-based condition is fulfilled in a duration D (equal to the offset value) between T9 and T8 (as shown in FIG. 12B), the associated CHO execution condition is determined to be fulfilled, the UE may perform a CHO after the duration D and/or stop evaluating the third measurement-based condition.

If there is not such a duration D, the associated CHO execution condition is determined not to be fulfilled. In some embodiments, if the associated CHO execution condition is determined not to be fulfilled, the UE may stop evaluating the third measurement-based condition and/or release the CHO execution condition after the time range.

As shown in FIG. 12A, referring to method 800, at T1, the UE receives a CHO configuration and associated CHO execution condition and starts the second timer, and the second timer expires at T7. In this example, TTT is not configured. At T7, the UE starts the third timer and starts to evaluate the fourth measurement-based condition. The UE determines whether the fourth measurement-based condition is met in the time range from T7 to T8. For example, if the UE determines that the fourth measurement-based condition is met at the time point P between T7 and T8, the UE determines that the associated CHO conditions are fulfilled, and determines to perform a CHO even before T8; furthermore, the UE may stop evaluating the fourth measurement-based condition.

If there is no time point between T7 and T8 where the fourth measurement-based condition is fulfilled, the UE determines that the associated CHO conditions are fulfilled. In some embodiments, the UE may stop evaluating the fourth measurement-based condition and/or release the CHO execution condition after T8.

As shown in FIG. 12B, referring to method 900, at T1, the UE receives a CHO configuration and associated CHO execution condition and starts the second timer, and the second timer expires at T7. In this example, TTT is configured. T9 is at an offset value ahead of T7 where the second timer expires. The UE starts to evaluate the fourth measurement-based condition at T9.

If the fourth measurement-based condition is fulfilled in a duration D (equal to the offset value) between T9 and T8 (as shown in FIG. 12B), the associated CHO execution condition is determined to be fulfilled, the UE may perform a CHO after the duration D and/or stop evaluating the fourth measurement-based condition.

If there is not such a duration D, the associated CHO execution condition is determined not to be fulfilled. In some embodiments, if the associated CHO execution condition is determined not to be fulfilled, the UE may stop evaluating the fourth measurement-based condition and/or release the CHO execution condition after the time range.

In FIGS. 10B, 11B, and 12B, in some embodiments, the offset value equals to TTT if TTT is configured.

When a UE accesses a radio access network including a NTN, an RLF or a handover possibly occurs. Mobility Robustness Optimization (MRO) is to detect connection failures that occur due to Too Early or Too Late Handovers, or Handover to Wrong Cell. The general procedure is that after RLF/HO failure happen, UE access new cell by re-establishment or connection setup. Once UE enters connected state, UE transmits RLF report and RACH report to the serving cell. The serving cell will transmit Failure Indication including RLF report to the last serving cell. Finally, the information is used to optimize the mobility.

Figure 13:
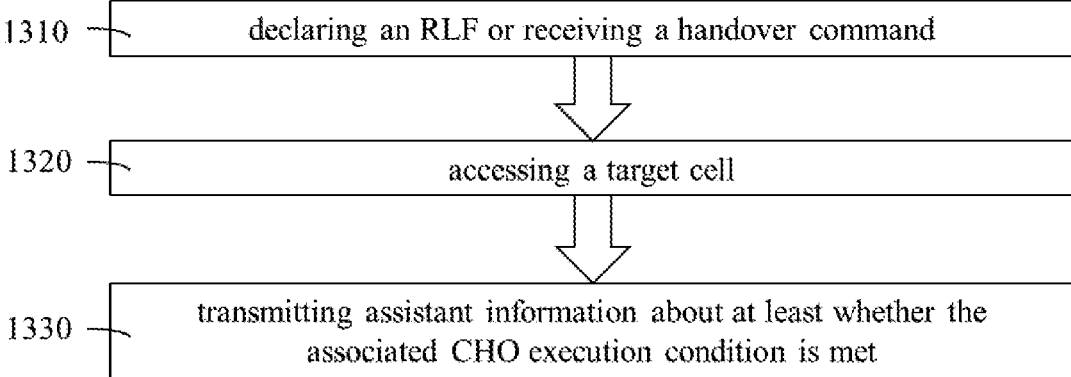
FIG. 13 illustrates an exemplary method 1300 performed by a UE according to the present disclosure.

FIG. 13 illustrates an exemplary method 1300 performed by a UE according to the present disclosure.

As shown in FIG. 13, the method 1300 includes at least an operation 1310, an operation 1320, and an operation 1330. The operation 1310 illustrates declaring an RLF or receiving a handover command. The operation 120 illustrates accessing a target cell. The operation 130 illustrates transmitting assistant information about at least whether the associated CHO execution condition is met.

In some embodiments, the associated CHO execution condition includes at least a time-based condition, and the operation 130 illustrates at least whether the time-based condition is fulfilled. In some embodiments, the time-based condition includes at least a timer, a time threshold, and/or a time range.

In some embodiments, the associated CHO execution condition further includes at least a measurement-based condition and the operation 130 illustrate whether the measurement-based condition is fulfilled.

In some embodiments, in combination with methods 200 or 300, in the operation 1330, the UE transmits at least one of an indication to indicate whether the first timer expires when the RLF occurs, an indication to indicate whether the first timer expires when receiving the handover command, an indication to indicate whether the first measurement-based condition is met, an indication to indicate whether the first measurement-based condition is met before the first timer runs in response to the first measurement-based condition being met, an indication to indicate whether the first measurement-based condition is met while the first timer runs in response to the first measurement-based condition being met, an indication to indicate whether the first measurement-based condition is met after the first timer expiry in response to the first measurement-based condition being met, and/or an indication to indicate the time information associated with that the first measurement-based condition is met.

In some embodiments, in combination with methods 400 or 500, in the operation 1330, the UE transmits at least one of an indication to indicate whether the RLF occurs before, within, or after a time range determined by the starting time and the end time, an indication to indicate whether the reception of the handover command occurs before, within, or after the time range, an indication to indicate whether the second measurement-based condition is met, an indication to indicate whether the second measurement-based condition is met before the time range in response to the second measurement-based condition being met, and an indication to indicate time information associated with that the second measurement-based condition is met.

In some embodiments, in combination with methods 600 or 700, in the operation 1330, the UE transmits at least one of an indication to indicate whether the RLF occurs before, within, or after the time range; an indication to indicate whether the reception of the handover command occurs before, within, or after the time range; and an indication whether the third measurement-based condition is met, an indication to indicate whether the third measurement-based condition is met before the time range in response to the third measurement-based condition being met, and an indication to indicate the time information associated with that the third measurement-based condition is met.

In some embodiments, in combination with methods 800 or 900, in the operation 1330, the UE transmits at least one of state of the second timer and the third timer when the RLF or the reception of the handover command occurs, and an indication to indicate whether the fourth measurement-based condition is met, state of the second time and the third time when the fourth measurement-based condition is met, and/or information about when the fourth measurement-based condition is met in response to the fourth measurement-based condition being met, an indication to indicate time information associated with that the fourth measurement-based condition is met.

The present disclosure provides a new mechanism for start/stop the evaluation on the measurement-based condition during a CHO procedure. The present disclosure provides various methods and embodiments for introduce associated CHO execution condition, the associated CHO execution condition at least include the measurement-based condition and the time-based condition; furthermore, the associated CHO execution condition includes at least a timer, a time threshold, and/or a time range; moreover, the associated CHO execution condition considers TTT.

In some embodiments, S-criteria is introduced for evaluating the measurement-based condition.

In some embodiments, MRO for time/timer-based condition in combination with other condition is introduced for a CHO procedure, which helps to optimizing the network mobility.

The spirit of the present disclosure is not limited to the various embodiments, examples, and methods mentioned previously. On the basis of not violating the inventive spirit of the present invention, the above various embodiments in the present invention can be reasonably extended or combined together.

An apparatus is provided for performing various methods and embodiments according to the present disclosure. In some embodiments, the apparatus includes at least a processor; a transceiver coupled to the processor, wherein the processor is configured: to receive, via the transceiver, a conditional handover (CHO) configuration and at least an associated CHO execution condition for a candidate cell from a serving cell, wherein the associated CHO execution condition includes a time-based condition; to evaluate the associated CHO execution condition; and to determine whether to execute a CHO based on the evaluation. In some embodiments, the apparatus is at least a part of a UE.

Figure 14:
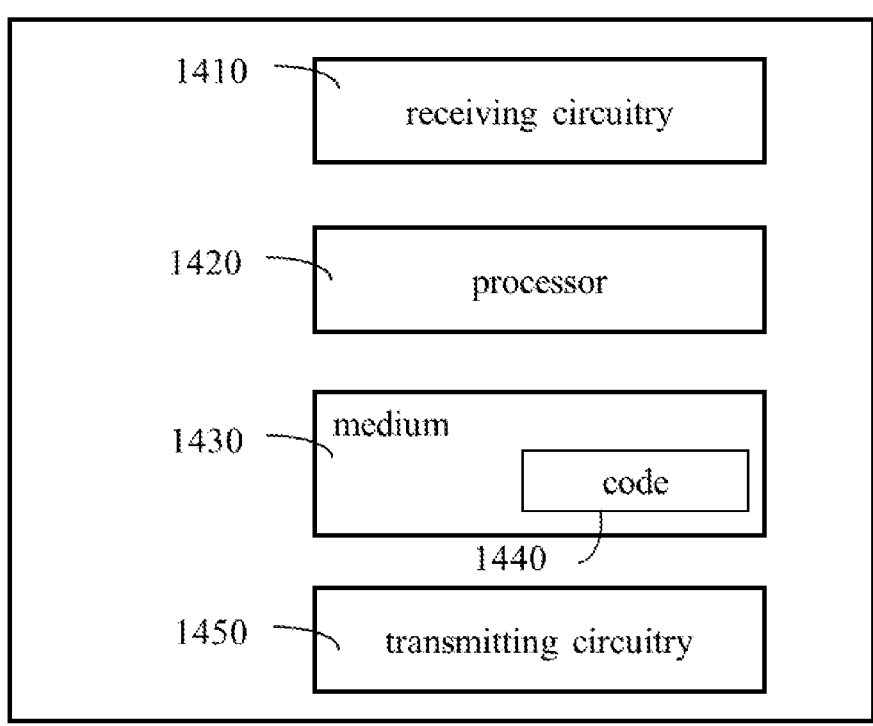
FIG. 14 illustrates an example apparatus according to some embodiments of the present disclosure.

FIG. 14 illustrates an exemplary apparatus 1400 for performing the previously mentioned methods, e.g., methods 100-900. The apparatus 1400, for example, may be at least a part of a UE.

As shown in FIG. 14, the apparatus 1400 may include at least one receiving circuitry 1410, at least one processor 1420, at least one non-transitory computer-readable medium 1430 with computer-executable code 1440 stored thereon, and at least one transmitting circuitry 1450. The at least one medium 1430 and the computer-executable code 1440 may be configured to, with the at least one processor 1420, cause the apparatus 1400 at least to perform at least the example methods described above.

In various example embodiments, the at least one processor 1420 may include, but not limited to, at least one hardware processor, including at least one microprocessor such as a CPU, a portion of at least one hardware processor, and any other suitable dedicated processor such as those developed based on for example Field Programmable Gate Array (FPGA) and Application Specific Integrated Circuit (ASIC). Further, the at least one processor 1420 may also include at least one other circuitry or element not shown in FIG. 14.

In various example embodiments, the at least one non-transitory computer-readable medium 1430 may include at least one storage medium in various forms, such as a volatile memory and/or a non-volatile memory. The volatile memory may include, but not limited to, for example, an RAM, a cache, and so on. The non-volatile memory may include, but not limited to, for example, an ROM, a hard disk, a flash memory, and so on. Further, the at least non-transitory computer-readable medium 1430 may include, but are not limited to, an electric, a magnetic, an optical, an electro-magnetic, an infrared, or a semiconductor system, apparatus, or device or any combination of the above.

Further, in various example embodiments, the exemplary apparatus 1400 may also include at least one other circuitry, element, and interface, for example antenna element, and the like.

In various example embodiments, the circuitries, parts, elements, and interfaces in the exemplary apparatus 1400, including the at least one processor 1420 and the at least one non-transitory computer-readable medium 1430, may be coupled together via any suitable connections including, but not limited to, buses, crossbars, wiring and/or wireless lines, in any suitable ways, for example electrically, magnetically, optically, electromagnetically, and the like.

The methods of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:

at least one memory; and at least one processor coupled with the at least one memory and configured to cause the UE to:

receive, from a serving cell, a conditional handover (CHO) configuration and at least an associated CHO execution condition for a candidate cell, the associated CHO execution condition including one or more time-based conditions and one or more measurement-based conditions;

evaluate the associated CHO execution condition, wherein evaluating the associated CHO execution condition comprises evaluating a measurement-based condition of the one or more measurement-based conditions based on a time-based condition of the one or more time-based conditions, and wherein the time-based condition is fulfilled based on a threshold for a beginning of a time range being met; and determine whether to execute a CHO based on the evaluation.

2. The UE of claim 1, wherein a time-based condition of the one or more time-based conditions includes a first timer, and the one or more measurement-based conditions includes a first measurement-based condition, wherein the time-based condition is fulfilled in response to expiry of the first timer and the at least one processor is configured to cause the UE to:

one or more of declare a radio link failure (RLF) or receive a handover command;

access a target cell; and transmit at least one of:

an indication to indicate whether the first timer expires when the RLF occurs;

an indication to indicate whether the first timer expires when receiving the handover command;

an indication to indicate whether the first measurement-based condition is met;

an indication to indicate whether the first measurement-based condition is met before the first timer runs in response to the first measurement-based condition being met;

an indication to indicate whether the first measurement-based condition is met while the first timer runs in response to the first measurement-based condition being met;

an indication to indicate whether the first measurement-based condition is met after the first timer expiry in response to the first measurement-based condition being met; or an indication to indicate time information associated with that the first measurement-based condition is met.

3. The UE of claim 1, wherein the one or more measurement-based conditions includes a second measurement-based condition, and a time-based condition of the one or more time-based conditions includes at least a first second threshold of a starting time, a third threshold of an end time, and wherein the time-based condition is fulfilled in response to that a current time is between the starting time and the end time, and the at least one processor is configured to cause the UE to:

one or more of declare a radio link failure (RLF) or receive a handover command;

access a target cell; and transmit at least one of:

an indication to indicate whether the RLF occurs before, within, or after a time range determined by the starting time and the end time;

an indication to indicate whether reception of the handover command occurs before, within, or after the time range;

an indication to indicate whether the second measurement-based condition is met;

an indication to indicate whether the second measurement-based condition is met before the time range in response to the second measurement-based condition being met; or an indication to indicate time information associated with that the second measurement-based condition is met.

4. The UE of claim 1, wherein the time-based condition comprises:

the threshold for the beginning of the time range; and a value of the time range, wherein the time-based condition is fulfilled in response to that a current time is within the time range.

5. The UE of claim 4, wherein the at least one processor is configured to cause the UE to one or more of:

start to evaluate the measurement-based condition in response to the threshold for the beginning of the time range being met; or start to evaluate the measurement-based condition at an offset value ahead of the beginning of the time range.

6. The UE of claim 5, wherein the at least one processor is configured to cause the UE to:

determine, in response to the time-based condition being fulfilled, whether the measurement-based condition is fulfilled within the time range; and initiate the CHO in response to the measurement-based condition being fulfilled within the time range.

7. The UE of claim 5, wherein the at least one processor is configured to cause the UE to, in response to the measurement-based condition being unfulfilled within the time range:

stop evaluation of the measurement-based condition; or release the associated CHO execution condition.

8. The UE of claim 1, wherein the one or more measurement-based conditions includes a third measurement-based condition, and a time-based condition of the one or more time-based conditions comprises:

a second timer; and a third timer, wherein the time-based condition is fulfilled in response to expiry of the second timer and the third timer running.

9. The UE of claim 8, wherein the at least one processor is configured to cause the UE to start the second timer in response to receiving the CHO configuration and the associated CHO execution condition.

10. The UE of claim 9, wherein the at least one processor is configured to cause the UE to:

start, in response to the second timer expiry, the third timer; and in response to the second timer expiry or in response to starting the third timer, one or more of start to evaluate the third measurement-based condition or start to evaluate the third measurement-based condition at an offset value ahead of the second timer expiry.

11. The UE of claim 10, wherein the at least one processor is configured to cause the UE to:

determine, in response to the time-based condition being fulfilled, whether the third measurement-based condition is fulfilled before the third timer expires; and initiate the CHO in response to the third measurement-based condition being fulfilled before the third timer expires.

12. The UE of claim 4, wherein the at least one processor is configured to cause the UE to:

one or more of declare a radio link failure (RLF) or receive a handover command;

access a target cell; and transmit at least one of:

an indication to indicate whether the RLF occurs before, within, or after the time range;

an indication to indicate whether reception of the handover command occurs before, within, or after the time range;

an indication to indicate whether the measurement-based condition is met;

an indication to indicate whether the measurement-based condition is met before the time range in response to the measurement-based condition being met; or an indication to indicate time information associated with that the measurement-based condition is met.

13. The UE of claim 8, wherein the at least one processor is configured to cause the UE to:

one or more of declare a radio link failure (RLF) or receive a handover command;

access a target cell; and transmit at least one of:

a state of the second timer and the third timer when the RLF or reception of the handover command occurs;

an indication to indicate whether the third measurement-based condition is met;

a state of the second timer and the third timer when the third measurement-based condition is met in response to the third measurement-based condition being met; or an indication to indicate time information associated with that the third measurement-based condition is met.

14. The UE of claim 11, wherein the at least one processor is configured to cause the UE to:

in response to the third measurement-based condition being unfulfilled before the third timer expires, one or more of stop evaluation of the third measurement-based condition or release the CHO execution condition.

15. A method performed by a user equipment (UE), the method comprising:

receiving, from a serving cell, a conditional handover (CHO) configuration and at least an associated CHO execution condition for a candidate cell, the associated CHO execution condition including one or more time-based conditions and one or more measurement-based conditions;

evaluating the associated CHO execution condition, wherein evaluating the associated CHO execution condition comprises evaluating a measurement-based condition of the one or more measurement-based conditions based on a time-based condition of the one or more time-based conditions, and wherein the time-based condition is fulfilled based on a threshold for a beginning of a time range being met; and determining whether to execute a CHO based on the evaluation.

16. A user equipment (UE) for wireless communication, comprising:

at least one memory; and at least one processor coupled with the at least one memory and configured to cause the UE to:

receive, from a serving cell, a conditional handover (CHO) configuration and associated CHO execution condition for a candidate cell, the associated CHO execution condition including at least a time-based condition, the time-based condition including a first timer and a first measurement-based condition, and the time-based condition being fulfilled in response to expiry of the first timer;

start the first timer in response to reception of the CHO configuration and the associated CHO execution condition;

evaluate the first measurement-based condition in response to the time-based condition being fulfilled, wherein the time-based condition is fulfilled based on a threshold for a beginning of a time range being met; and determine whether to execute a CHO at least according to a state of the associated CHO execution condition.

17. A method performed by a user equipment (UE), the method comprising:

receiving, from a serving cell, a conditional handover (CHO) configuration and associated CHO execution condition for a candidate cell, the associated CHO execution condition including at least a time-based condition, the time-based condition including a first timer and a first measurement-based condition, and the time-based condition being fulfilled in response to expiry of the first timer;

starting the first timer in response to reception of the CHO configuration and the associated CHO execution condition;

evaluating the first measurement-based condition in response to the time-based condition being fulfilled, wherein the time-based condition is fulfilled based on a threshold for a beginning of a time range being met; and determining whether to execute a CHO at least according to a state of the associated CHO execution condition.

18. The method of claim 15, wherein a time-based condition of the one or more time-based conditions includes a first timer, and the one or more measurement-based conditions includes a first measurement-based condition, wherein the time-based condition is fulfilled in response to expiry of the first timer, and further comprising:

one or more of declaring a radio link failure (RLF) or receiving a handover command;

accessing a target cell; and transmitting at least one of:

an indication to indicate whether the first timer expires when the RLF occurs;

an indication to indicate whether the first timer expires when receiving the handover command;

an indication to indicate whether the first measurement-based condition is met;

an indication to indicate whether the first measurement-based condition is met before the first timer runs in response to the first measurement-based condition being met;

an indication to indicate whether the first measurement-based condition is met while the first timer runs in response to the first measurement-based condition being met;

an indication to indicate whether the first measurement-based condition is met after the first timer expiry in response to the first measurement-based condition being met; or an indication to indicate time information associated with that the first measurement-based condition is met.

19. The method of claim 15, wherein the one or more measurement-based conditions includes a second measurement-based condition, and a time-based condition of the one or more time-based conditions includes at least a second threshold of a starting time, a third threshold of an end time, and wherein the time-based condition is fulfilled in response to that a current time is between the starting time and the end time, and further comprising:

one or more of declaring a radio link failure (RLF) or receiving a handover command;

accessing a target cell; and transmitting at least one of:

an indication to indicate whether the RLF occurs before, within, or after a time range determined by the starting time and the end time;

an indication to indicate whether reception of the handover command occurs before, within, or after the time range;

an indication to indicate whether the second measurement-based condition is met;

an indication to indicate whether the second measurement-based condition is met before the time range in response to the second measurement-based condition being met; or an indication to indicate time information associated with that the second measurement-based condition is met.

20. The method of claim 15, wherein the time-based condition comprises:

the threshold for the beginning of the time range; and a value of the time range, wherein the time-based condition is fulfilled in response to that a current time is within the time range.

* * * * *